Oct. 14, 1930.  J. S. DA COSTA  1,778,484
CONVEYER MECHANISM
Original Filed Nov. 28, 1928  2 Sheets-Sheet 1
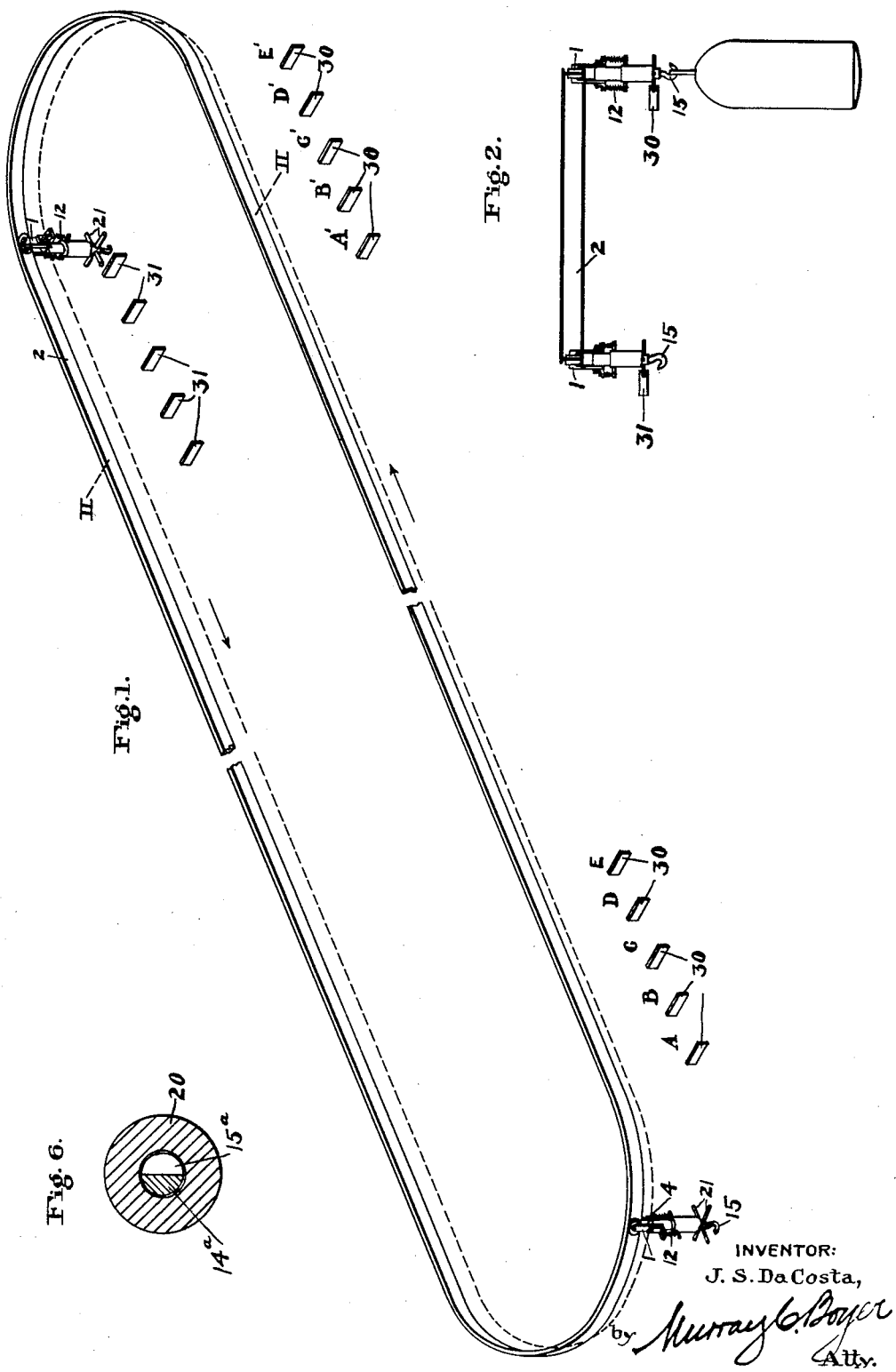

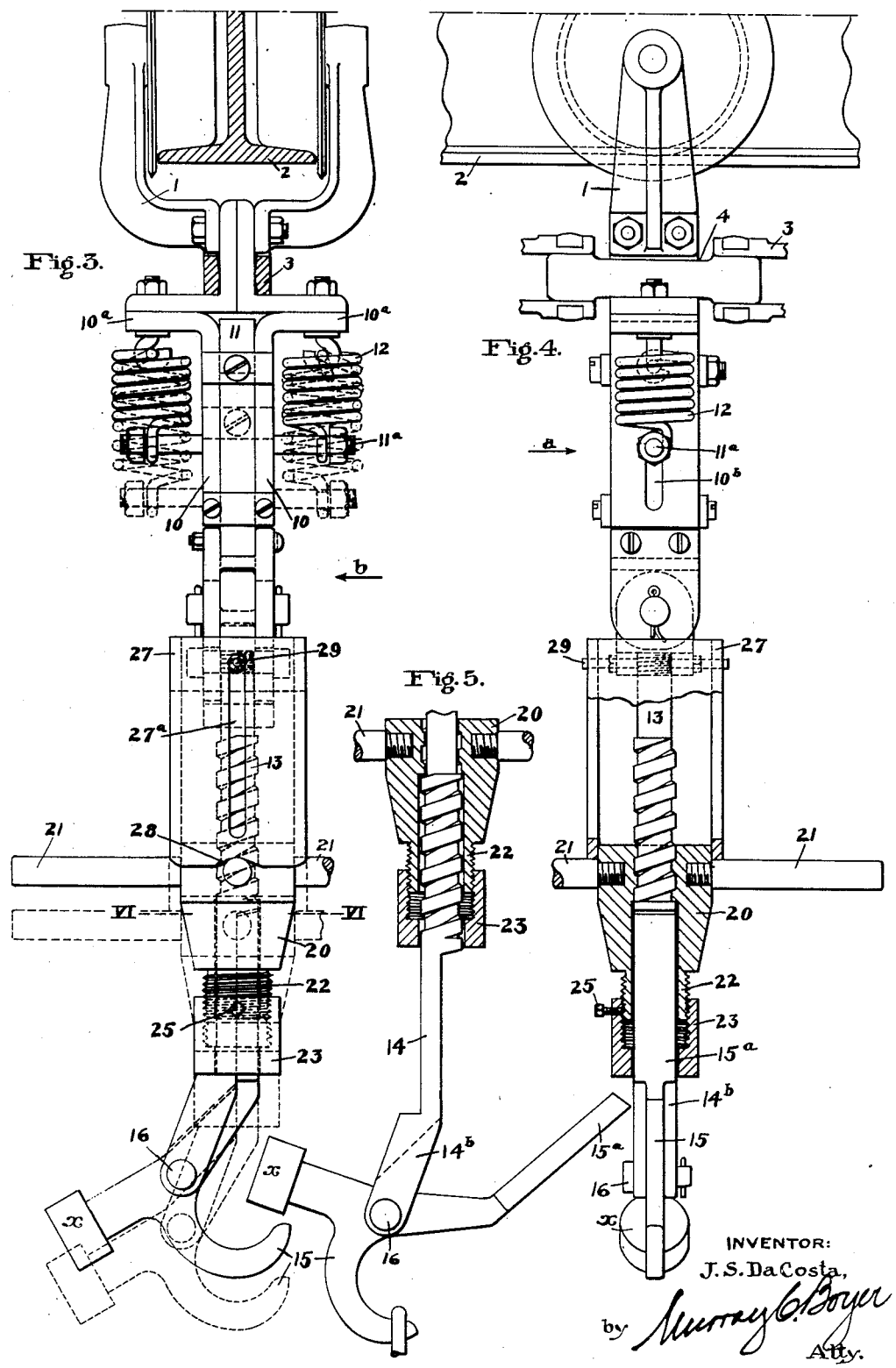

Patented Oct. 14, 1930

1,778,484

UNITED STATES PATENT OFFICE

JAMES STARR DA COSTA, OF PHILADELPHIA, PENNSYLVANIA, ASSIGNOR OF ONE-HALF TO JERVIS B. WEBB, OF DETROIT, MICHIGAN

CONVEYER MECHANISM

Application filed November 28, 1928, Serial No. 322,429. Renewed September 4, 1930.

My invention relates to continuous overhead conveyer structures, and one object of my invention is to provide a conveyer structure comprising a continuous rail or trackway having trolleys mounted thereon, supporting suspension hooks from which bags or other articles may be suspended.

A further object of my invention is to provide a special form of suspension hook that may open to discharge the load suspended therefrom but is normally in the closed position and is held in the closed position by a sleeve which is vertically movable with respect to the releasable portion of the hook.

A further object of my invention is to provide means for moving such sleeve with respect to the releasable portion of such hook, with provision for holding said sleeve in its several vertical positions.

A further object of my invention is to provide the shank or stem of the hook with a screw thread and internally thread the sleeve whereby it may function as a nut which may turn relatively to such thread, such sleeve enclosing an upper shank portion of the suspension hook when in one position, and releasing such shank portion and permitting the hook to drop and discharge a suspended article when in another position.

A further object of my invention is to provide automatic means in the line of travel of the hook whereby such sleeve may be turned in both directions; such means serving to set the sleeve relatively to the releasable hook portion under one condition and releasing the hook under another condition.

These and other features of my invention are more fully described hereinafter; reference being had to the accompanying drawings, in which:

Figure 1 is a diagrammatic view of a conveyer system showing a hook structure and operating means therefor embodying my invention;

Fig. 2 is a sectional view on the line II—II, Fig. 1, illustrating a detail of the automatic operating means for the hook structures employed with my conveyer system;

Fig. 3 is an enlarged view of my improved suspension hook in the operative supporting position, looking in the direction of the arrow *a*, Fig. 4;

Fig. 4 is an elevation, partly in section, looking in the direction of the arrow *b*, Fig. 3;

Fig. 5 is a view, partly in section, showing the hook in the released position, and Fig. 6 is a sectional plan view on the line VI—VI, Fig. 3.

My invention, relating to overhead conveyers, comprises a series of double-wheeled trolleys 1, adapted to a suitable track which may be in the form of an I-beam rail 2; a suitable endless chain 3 being employed to which the trolleys may be connected at the point 4. The trolleys may be disposed at various intervals successively with respect to the chain for the proper support of the latter, and the chain may be driven by suitable means so that supporting members suspended from said chain may be conveyed from point to point.

Depending from the chain at intervals, which may coincide with the position of the trolleys, are yoke members 10. Within these yoke members are vertically movable rods 11, guided in said yokes and normally held in the raised position by springs 12, depending from arms 10$^a$ of the yoke and connected at their lower ends to a bar 11$^a$ passing through the rod 11, and through slots 10$^b$ in said yoke members. From the lower end of the rods 11 are pivotally hung screw stems 13, whose lower ends terminate in shanks 14; said shanks being half round for a certain distance as indicated at 14$^a$, and split at the lower end to form ears 14$^b$. Hook members 15, pivotally connected to said ears at 16, have an upper extension in the form of half round shanks 15$^a$ which match the half round shanks 14 of the screws stems, and are disposed adjacent thereto when said hook members are in the normal supporting position.

Adapted to the thread of the screw stem is a sleeve nut 20, having operating arms 21; such nut having an externally threaded extension 22, to which an adjustable cap sleeve 23 is applied; such cap sleeve being adjustable on said threaded extension of the sleeve nut to compensate for wear on the upper end of the shank 15ᵃ and any wear on its under side; being held in its adjusted positions by means of a set screw 25. The normal position of the sleeve nut and the cap sleeve attached thereto may be anything between the limits of the thread of the screw upon which said sleeve nut is placed, and adjustment of the cap sleeve with respect to the nut is intended also to care for stretch that may occur in order to insure that the distance between the under surface of the threaded portion of the sleeve nut 20 and the lower surface of the cap sleeve 23 is slightly less than the distance between the top of the thread of the screw stem and the upper end of the half round shank 15ᵃ of the hook member.

In the carrying position, the nut and cap sleeve are disposed in such relation to the half round matching shanks of the screw stem and hook member that said parts will be held in operative position so that the hook member becomes a support.

In order to prevent accidental turning of the arms 21 of the sleeve nut 20, I provide loose sleeve 27 having rounded notches 28 which ride on said arms and having sufficient weight to prevent their accidental displacement. This sleeve 27 is held against turning by a pin 29 carried by the upper end of the screw stem and passing through slots 27ᵃ in the wall of said sleeve 27.

Disposed at intervals throughout the line of travel of the chain are a series of fixed abutments 30, (Fig. 1) which lie in the path of the arms 21 of the several sleeve nuts, and engage the same during the travel of the chain when the hook structures are loaded; such engagement effecting a 90° movement of the sleeve nut and eventually carrying the latter upwardly the full extent of the threaded portion of the screw stem for any given setting. This distance may vary depending upon the setting or vertical position of the sleeve nut with respect to the screw stem. When the nut reaches the upward limit of its travel, the under surface of the cap sleeve 23 clears the upper end of the half round shank 15ᵃ of the hook member, with the result that such hook member is released and may swing upon its pivotal connection 16 with the ears 14ᵇ depending from the half round shank 14ᵃ of the screw stem; permitting the load to drop from said hook member at a predetermined point, as clearly indicated in Fig. 5.

After the load has been discharged, the hook will resume its normal position by reason of the action of the counterweight $x$, and upon turning the sleeve nut in the opposite direction it will be lowered over the shank 15ᵃ of the hook and will be held in such position until the arms of the sleeve nut are brought into position to be engaged by the fixed abutments after the hook has been loaded.

The present conveyer structure has been designed more particularly for the conveying of packages, bags, or other articles in large establishments where such bags or other articles are to be attached at various points throughout the extent of travel of the chain, whose movement is relatively slow. Such bags may be attached at various points in the travel of the chain and the position of the sleeve nuts on the screw stems of the suspension devices are properly correlated with the point of discharge and coordinated with the other factors.

For instance, as this conveyer is designed to receive bags at various points and deliver them at a series of stations, all of the sleeve nuts may be set in the lowermost position relatively to the half round shank of the screw stem, whose shoulder limits the lowering of the nut. Then by disposing the fixed abutments 30 at proper intervals, each sleeve nut will be given the same amount of turning motion each time it passes one of said abutments 30, so that when such sleeve nuts receive successively the same amount of motion, they will travel up the threaded stem in the same relation and successively discharge their burden at predetermined points. This discharge will take place within a range of a few inches, depending upon slight inaccuracies that may occur in the dimensions of the parts and the relation of the threads of the screw with respect to the nut positions.

After the burden has been discharged, the position of the hook with its half round shank in proper position with relation to the half round shank of the screw stem, is automatically restored by the action of the counterweight and then by giving the sleeve nut a 90° lowering turn, as its arms pass each abutment, the cap sleeve and nut will be lowered to an extent sufficient to enclose the upper end of the half round shank of the pivoted hook member. By arranging fixed abutments 31, at some suitable point in the travel of the chain with respect to those indicated at 30 and which impart movement to the sleeve nuts to raise the latter, movement may be imparted to the sleeve nuts to lower the same to the desired lowermost limit, or at any other predetermined level. It will be readily understood that these abutments 30 and 31, which serve as the means for operating the sleeve nuts may be pivotally mounted so that if for any reason it is desired to operate the carrier structure for other time intervals, such condition may be cared for.

In the diagrammatic view illustrated in Fig. 1, it is assumed (for illustrative purposes only) that the conveyer has five loading stations, indicated at A, B, C, D and E, and before the load is attached the suspension hook is held in the elevated position; being supported by the springs carried by the yoke structure. When the load is placed thereon, the rod is lowered against the action of the springs; bringing the arms of the sleeve into position to be engaged by the fixed abutments 30 in the line of travel. If, for instance, the load is placed at station A and the chain is moved forward, the arms of the sleeve nut will be engaged by the successive fixed abutments, five in the present instance, and the complete one and one-quarter turn imparted to the sleeve nut will drop the load at delivery station A'. This condition will be maintained for hooks similarly set and loaded at stations B, C, D and E, for depositing loads at stations B', C', D' and E'. As the hooks carrying loads for their respective stations are carried forward by the chain, the arms of the several sleeve nuts will be brought into engagement with the successive fixed abutments 30 which turn each sleeve nut in the desired direction one and one-quarter turns. When the hook structures leave the discharging stations, they are raised by the springs and the sleeve nuts are brought opposite the fixed abutments 31 which engage the arms and lower the sleeve nuts over the upper portion of the hook and hold it against movement until the sleeve nut is again elevated therefrom by turning the same in the opposite direction for delivery purposes. It will be noted that the abutments 30 for engaging the arms of the sleeve nuts of the loaded hooks are disposed in a plane lower than the plane of the abutments 31 for engaging these arms when the hooks are traveling light, as clearly indicated in Fig. 2.

It will be understood, of course, that the sleeve nuts may have any desired vertical position with respect to the hook members, and that the nuts may be adjusted relatively to the screw to discharge bags or other objects which may be suspended from the hook members at any desired point. If desired, certain hooks may be designated by color or other means for the reception of bags or packages containing certain material which may be delivered at one point, and the other hooks may be arranged to receive other bags or packages at intervals dispersed throughout the travel of the conveyer to be delivered at a separate point.

Various arrangements for operating the sleeve nuts may be employed. For instance, the arms of the sleeve nut may be of different length, so that the sleeve nut of one or a series of carriers may be moved at every other interval of any setting of operating means for a predetermined condition. The abutments (30 or 31) may be adjusted relatively to the position of the arms of the sleeve nut during their travel, so as to impart movement greater or less than 90°, or normally fixed engaging elements set at intervals throughout the travel of the conveyer may have projections set at various heights, so that the arms of any one or a series of the sleeve nuts will be struck only when they are opposite certain operating portions of said members. All such modified constructions are within the scope of my invention.

I claim:

1. In a conveyer system, the combination of a rail, a series of trolleys adapted to move on said rail, a chain connecting said trolleys, suspension hook structures depending from said trolleys; each of said hook structures including a threaded shank and a hook proper pivotally hung and having an extension aligned with said shank, and means for holding said hook in the suspending position including a sleeve nut embracing said threaded shank and the hook extension, and means for actuating said sleeve nut whereby the hook may release an object supported thereby.

2. In a conveyer system, the combination of a rail, a series of trolleys adapted to move on said rail, a chain connecting said trolleys, suspension structures including threaded shanks depending from said trolleys, pivoted hooks connected to said threaded shanks and having extensions aligned therewith, sleeve nuts adapted to said threaded shanks and embracing the extensions of said pivoted hooks for holding the latter in the active suspending position, and means for actuating said sleeve nuts whereby the hooks may turn on their pivotal connections and release objects supported thereby.

3. In a conveyer system, the combination of a rail, a series of trolleys adapted to move on said rail, a chain connecting said trolleys, a suspension hook structure depending from said trolleys; said hook structure including a threaded shank and a hook proper pivotally hung and having an extension aligned with said shank, means for holding said hoop in the suspending position including a sleeve nut encircling the threaded shank and the extension of said hook, arms on said sleeve nut, and means in the path of the conveyer for engaging said arms and effecting vertical movement of said sleeve nut.

4. In a conveyer system, the combination of a rail, a series of trolleys adapted to move on said rail, a chain connecting said trolleys, a suspension hook structure depending from said trolleys; said hook structure including a threaded shank and a hoop proper pivotally hung and having an extension aligned with said shank, means for holding said hook in the suspending position including a sleeve nut encircling the threaded shank and the extension of said hook, arms on said sleeve nut, and fixed abutments in the path of the conveyer for engaging said arms and effecting vertical movement of said sleeve nut in both directions.

5. In a conveyer, a trolley, a frame depending therefrom, a slidable member supported by said frame, springs for holding said slidable member in the raised position, a screw stem depending from said slidable member, a hook pivotally connected to the lower end of said screw stem and having an upper extension aligned therewith, a sleeve nut embracing said screw stem and the extension of said hook, and arms carried by said sleeve nut whereby it may be turned on the thread of said screw stem, upward movement of said sleeve nut releasing the hook extension and permitting said hook to turn on its pivot and drop a load supported thereby.

6. In a conveyer, a trolley, a frame depending therefrom, a slidable member supported by said frame, springs for holding said slidable member in the raised position, a screw stem depending from said slidable member, a hook pivotally connected to the lower end of said screw stem; said hook having a portion adapted to lie in the plane of said screw stem, a sleeve nut embracing said screw stem and hook, arms carried by said sleeve nut whereby it may be turned on the thread of said screw stem; movement in one direction releasing the hook and permitting it to open and drop a load supported thereby, and a counterbalance for restoring the hook to normal position.

7. In a conveyer, a trolley, a frame depending therefrom, a slidable member supported by said frame, means for holding said slidable member in the raised position, a screw stem pivotally connected to and depending from said slidable member, a hook pivotally connected to the lower end of said screw stem; said hook having an upper shank portion adapted to lie in the plane of said screw stem, a sleeve nut embracing said screw stem and hook shank, and means for rotating said sleeve nut; movement in one direction releasing the hook shank and permitting it to open and drop a load supported by the hook.

8. In a conveyer, a trolley, a frame depending therefrom, a slidable member supported by said frame, means for holding said slidable member in the raised position, a screw stem pivotally connected to and depending from said slidable member, a hook pivotally connected to the lower end of said screw stem; said hook having an upper shank portion adapted to lie in the plane of said screw stem, a sleeve nut embracing said screw stem and hook shank, arms carried by said sleeve nut, means for engaging said arms to effect rotative movement of said sleeve nut; movement in one direction releasing the hook shank and permitting it to open and drop a load supported by the hook, and means for restoring the hook to normal position.

9. In a conveyer, a trolley, a frame depending therefrom, a chain connected to said frame, a slidable member supported by said frame, springs for holding said slidable member normally raised, a screw stem connected to the lower end of said slidable member, a hook pivotally connected to the lower end of said screw stem and having a portion lying in contact with the lower portion of said screw stem, a sleeve nut embracing said screw stem and overlying said hook extension; said sleeve nut being vertically movable on the screw stem in opposite directions to cover and release the hook extension.

10. In a conveyer, a trolley, a frame depending therefrom, a chain connected to said frame, a slidable member supported by said frame, springs for holding said slidable member normally raised, means for limiting the movement of said slidable member, a screw stem connected to the lower end of said slidable member, a hook pivotally connected to the lower end of said screw stem and having a portion lying in contact with the lower portion of said screw stem, a sleeve nut embracing said screw stem and overlying said hook extension; said sleeve nut being vertically movable on the screw stem in opposite directions to cover and release the hook extension, and adjustable means for maintaining the proper relation between the turning movement of said sleeve nut and the releasable portion of the hook.

11. In a conveyer, a trolley, a frame depending therefrom, a chain connected to said frame, a slidable member supported by said frame, springs for holding said slidable member normally raised, a screw stem pivotally connected to the lower end of said slidable member, a hook pivotally connected to the lower end of said screw stem; the latter having a cut away portion and the hook having a portion lying in contact with the cut away portion of said screw stem, a sleeve nut embracing said screw stem and overlying said hook extension; said sleeve nut being vertically movable on the screw stem to cover and release the hook extension, and means for moving said sleeve nut.

12. In a conveyer, a trolley, a frame depending therefrom, a chain connected to said frame, a slidable member supported by said frame, springs for holding said slidable member normally raised, a screw stem pivotally connected to the lower end of said slidable member, a hook pivotally connected to the lower end of said screw stem; the latter having a cut away portion and the hook having a portion lying in contact with the cut away portion of said screw stem, a sleeve nut embracing said screw stem and overlying said hook extension; said sleeve nut being vertically movable on the screw stem to cover and release the hook extension, arms carried by said sleeve nut and means for engaging said arms and effecting movement of said sleeve nut.

13. A suspension hook structure adapted for use with conveyer mechanism, comprising a supporting member, a threaded shank depending therefrom, a hook pivotally hung from said shank and having an extension aligned therewith, means for holding said hook in the suspending position including a sleeve nut embracing said threaded shank and the hook extension, and means for actuating said sleeve nut whereby the hook may release an object supported thereby.

14. A suspension hook structure adapted for use with conveyer mechanism, comprising a supporting member, a threaded shank depending therefrom, a spring connection between said parts, a hook pivotally hung from said shank and having an extension aligned therewith, a sleeve nut adapted to said threaded shank and embracing said hook extension, and means for actuating said sleeve nut whereby the hook may be released.

15. The combination with a substantially horizontally traveling conveyer, of a vertically disposed stem depending therefrom and traveling bodily therewith, a hook pivoted to the lower end of the stem, a horizontally rotative member mounted upon the stem, means for imparting vertical movement to said member under the influence of its horizontal rotation to move said member to locking and unlocking position, with respect to said hook and means for imparting turning movement to said member during and under the influence of its bodily travel.

16. The combination with a traveling conveyer, of a vertically disposed stem depending thereform and traveling bodily therewith, a hook pivoted to the lower end of the stem, a horizontally rotated member mounted upon the stem, means for imparting vertical movement to said member under the influence of its horizontal rotation to move said member to locking and unlocking position, with respect to said hook, and stops for imparting a step-by-step movement to the rotative member during its bodily travel with the conveyer to release the hook after a predetermined number of such step-by-step movements.

17. The combination with a traveling conveyer, of a depending threaded stem hung therefrom, a hook pivoted upon said stem having a locking extension, a nut threaded upon said stem adapted to engage said locking extension and hold the hook in article supporting position when said nut is turned in one direction upon said stem, and to release said locking extension and discharge the article supported by said hook when said nut is moved in the opposite direction, and means operable during the movement of the conveyer for imparting a step-by-step movement to said nut.

18. The combination with a traveling conveyer, of a depending threaded stem hung therefrom, a hook pivoted upon said stem having a locking extension, a nut threaded upon said stem adapted to engage said locking extension and hold the hook in article supporting position when said nut is turned in one direction upon said stem and to release said locking extension and discharge the article supported by said hook, when the nut is turned in the opposite direction, laterally projecting arms carried by said nut and stops arranged adjacent the line of travel of the conveyer, adapted to be engaged by said arms to impart step-by-step turning movement to the nut.

19. The combination with a horizontally traveling conveyer, of a vertically disposed stem depending therefrom, a hook pivoted to the lower end of the stem, a horizontally rotative member mounted upon the stem, means for imparting vertical movement to said member under the influence of its horizontal rotation to locking and unlocking position, with respect to said hook, a retarding element for preventing overthrow movement of the rotative member.

20. A structure as recited in claim 18, in combination with a floating sleeve having a notched lower edge beneath which said arms ride and which act to prevent overthrow movement of said arms.

21. The combination with a horizontally traveling conveyer, of a vertically disposed stem, spring supported with respect to said conveyer, a hook movably mounted upon the lower end of the stem, a horizontally rotative member mounted upon the stem, means for imparting vertical movement to said member under the influence of its rotation, to locking and unlocking position with respect to said hook, and stops engageable by said rotative member for imparting a step-by-step turning movement to the rotative member during its bodily travel with the conveyer to release the hook after a predetermined number of such movements.

22. The combination with a substantially horizontally traveling conveyer, of a stem depending therefrom, a horizontally rotated part carried by and traveling bodily with the stem, horizontal projections carried by said part, stops arranged along the line of travel of the conveyer for engagement by said projections to impart movement to the horizontally rotated part, a hook pivotally mounted upon said stem for movement to and from load-supporting and locked position, and means for effecting locking of the said hook in load-supporting position through action of the horizontally rotated part.

In witness whereof I have signed this specification.

J. STARR DA COSTA.